July 21, 1953 — A. W. FRANCIS — 2,646,387
SOLVENT RECOVERY WITH LIQUID CARBON DIOXIDE
Filed May 17, 1950 — 3 Sheets-Sheet 3

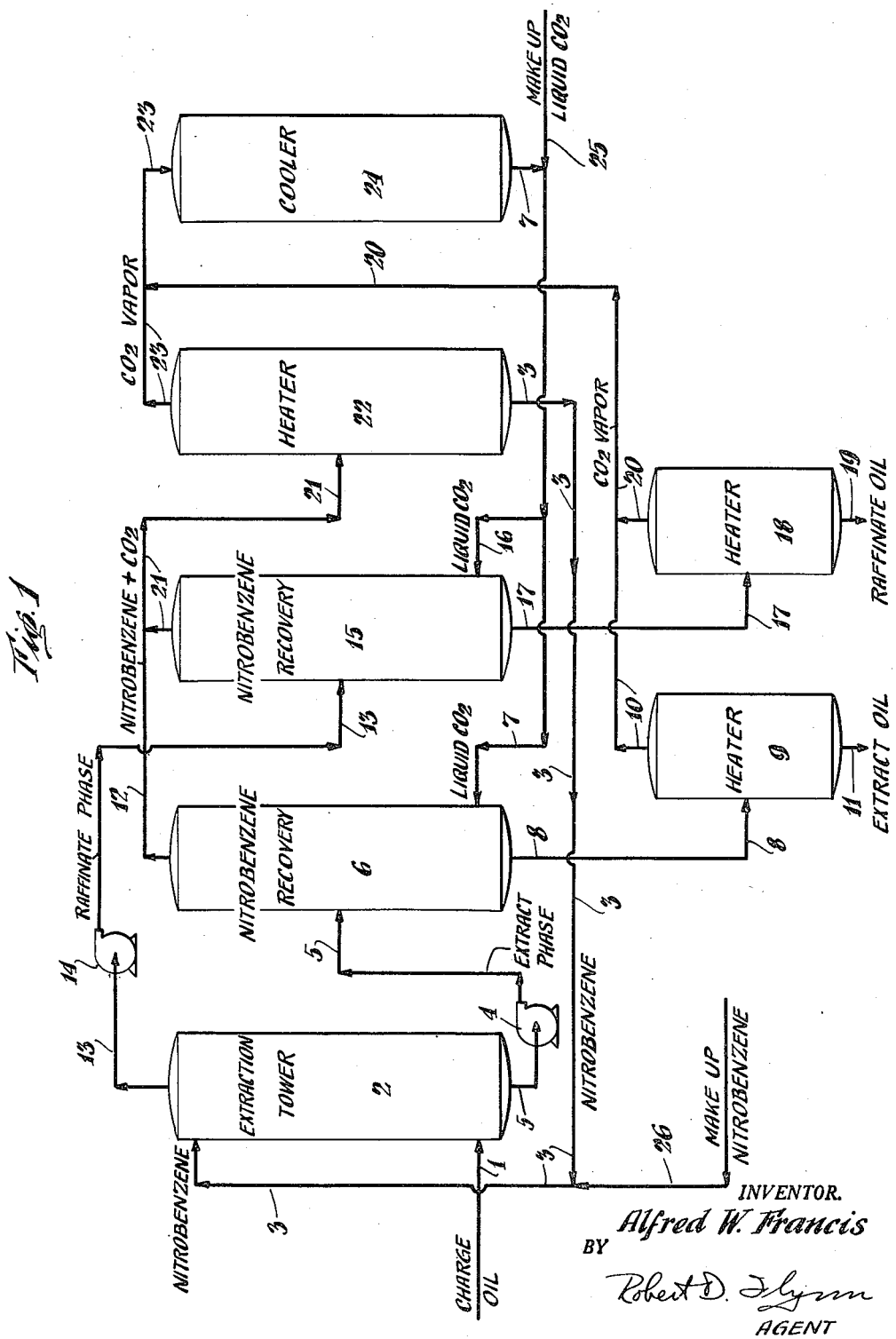

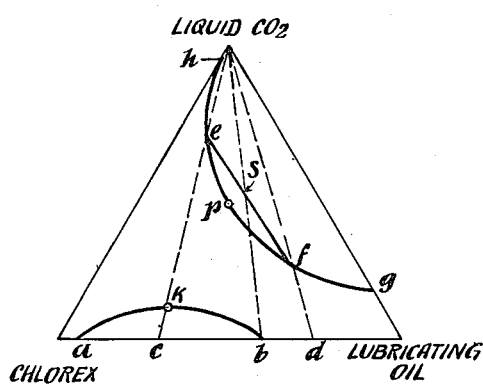
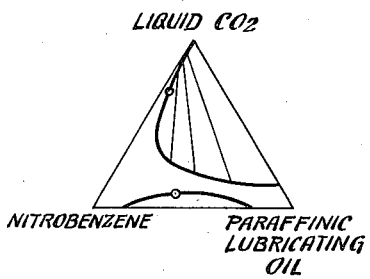
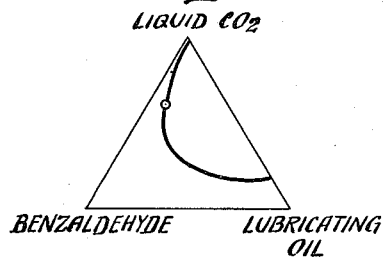
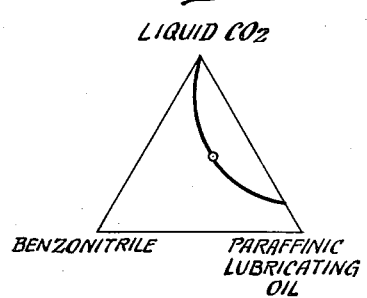
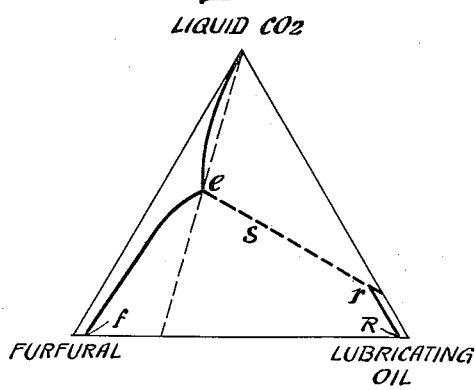
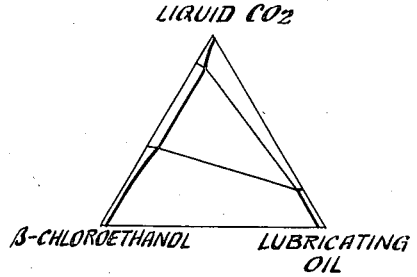

INVENTOR.
Alfred W. Francis
BY
Robert D. Flynn
AGENT

Patented July 21, 1953

2,646,387

UNITED STATES PATENT OFFICE 2,646,387

SOLVENT RECOVERY WITH LIQUID CARBON DIOXIDE

Alfred W. Francis, Woodbury, N. J., assignor to Socony-Vacuum Oil Company, Incorporated, a corporation of New York Application May 17, 1950, Serial No. 162,587

10 Claims. (Cl. 196—14.15)

This invention has to do with solvent recovery and, more particularly, has to do with the recovery of solvents from fractions obtained by solvent extraction of mixtures such as animal, vegetable and mineral oils.

As is well known to those familiar with the art, numerous solvents have been used to separate fractions, or compounds, of different character from mixtures containing the same. In all such instances an extract phase and a raffinate phase are obtained. The extract phase generally comprises a relatively large proportion of solvent and a relatively small proportion of extracted material, such for example as a hydrocarbon fraction. The raffinate phase, however, is generally comprised of a large amount of the original mixture and a small amount of solvent. For efficient and economical operation, however, it is essential that the solvent be recovered substantially intact from the extract and raffinate phases, and essential also that the fraction present in the same phases be unaffected by the procedure used in recovering the solvent.

With relatively high boiling solvents such as Chlorex ($\beta,\beta'$-dichlordiethyl ether), furfural and nitrobenzene, difficulties are encountered in distilling the solvent from the extract and raffinate phases. For example, Chlorex boils at 352 F. or 178° C., and when heated for a substantial period at the boiling point small amounts of hydrochloric acid are formed. This feature is such as to make essential a neutralizing operation in order that corrosion of equipment be minimized. Similarly, furfural has a boiling point of 323° F. or 162° C., and is subject to polymerization when heated for extended periods of time, especially if air and light are not rigorously excluded. This leads to the formation of resinous bodies which must be removed from the extraction system. Some measure of success in alleviating this problem has been realized by adding small amounts of polymerization inhibitors or retarders, but this is an expensive procedure and is subject to the disadvantage that a foreign material is either incorporated into the extract and/or raffinate fractions or requires removal by a further treatment. Another example is that of nitrobenzene, which boils at 411.5° F. or 210.8° C. Considerable heat is required to remove nitrobenzene from the extract and raffinate phases in which it is present. At the high temperatures used in removing nitrobenzene, the extract and raffinate fractions often deteriorate in quality. Moreover, small amounts of the oil fractions are distilled with the nitrobenzene and are lost unless carefully recovered or recycled.

Still another reason for seeking a method different from distillation for recovering solvents from oils is that some solvents, which would have extremely high selectivity for oils of high viscosity index, are not considered because of their high boiling points. It has been shown (Industrial and Engineering Chemistry 36, 769 (1944)) that, among similar organic solvents, selectivity is largely a direct function of the boiling point of the solvent. High boiling solvents are customarily disqualified for use in commercial operations because it would be impractical to recover the solvents from the oil fractions by distillation. One such solvent is benzoic anhydride which boils at 680° F. or 360° C. Benzoic anhydride has been shown to be highly selective (ibid, page 768). It could be used to extract oils, but recovery from the resulting oil fractions by distillation is impractical. The process contemplated herein and described below, however, makes possible an efficient recovery of this reagent (benzoic anhydride), and other high boiling solvents.

Solvent recovery processes other than distillation have also been proposed, but they, too, have serious shortcomings. For example, washing with water, aqueous acids or aqueous alkalies is complicated because water tends to form stable emulsions with the oil fractions. Furthermore, a subsequent redistillation to separate the water is required. In some cases, such as with benzoic anhydride, mentioned above, the solvent is changed chemically (e. g., to benzoic acid), so that a chemical resynthesis is necessary to recover the solvent for reuse.

This invention is predicated upon an efficient and economical procedure for recovering relatively high boiling solvents from extract and/or raffinate phases. It will be understood, however, that the novel procedure described and claimed herein can be used to effect recovery of such solvents from other materials regardless of the source thereof, provided these materials have a relatively low solubility in liquid carbon dioxide.

It has now been found that liquid carbon dioxide selectively removes relatively high boiling solvents from an extract phase, raffinate phase or the like, when contacted therewith. The solvents so removed by liquid carbon dioxide are characterized by a substantial miscibility with liquid carbon dioxide. The solvents are further characterized by not forming a solid compound or complex with liquid carbon dioxide such as a salt. The new process is particularly useful with solvents boiling above about 150° C., for lower boiling solvents can generally be recovered by distillation procedure; however, there is no lower limit in boiling point of a solvent to restrict the process.

It is an object of this invention, therefore, to provide a procedure for recovering solvents of the aforesaid character from mixtures containing the same. A further object of the invention is the provision of a continuous process for the recovery of such solvents from extract and raffinate phases obtained in a solvent extraction operation.

A more particular object of the invention is to provide for the recovery of such solvents from oils which have been selectively extracted with the solvent.

Other objects and advantages of the invention will be apparent from the following description.

In order that the invention may be more readily understood, a typical solvent recovery is described below with reference being made to Figure 1 attached hereto.

In Figure 1, a charge such as a lubricating oil stock, for example, a Pennsylvania lubricating oil distillate, is introduced through line 1 to extraction tower 2. Nitrobenzene is introduced through line 3 to extractor 2 wherein it flows countercurrent to the oil charge. It will be understood that the extractor 2 can comprise conventional countercurrent stage or tower extraction equipment. Contact of nitrobenzene and oil can also be aided by conventional packing material in extractor 2.

In the extractor 2, a raffinate phase and an extract phase are formed. The raffinate phase contains a relatively large proportion of the paraffinic hydrocarbons present in the oil charge, together with minor amounts of naphthenes and aromatics, and also contains a small quantity of nitrobenzene. The extract phase comprises naphthenes and aromatics together with a minor amount of paraffins, in association with a large proportion of nitrobenzene.

The extract phase in extractor 2 is removed by means of pump 4 operating against high pressure, through line 5 to recovery tower 6 wherein it is extracted countercurrently with liquid carbon dioxide. The latter is introduced through line 7 to tower 6. The temperature of the extract phase and liquid carbon dioxide in tower 6 should be not much greater than about 31.1° C., the critical temperature of carbon dioxide. Slightly higher operating temperatures, up to about 36° C., are permissible, since the solvent dissolved in the carbon dioxide raises the latter's critical temperature. This temperature condition can be realized by maintaining both the extract phase and liquid carbon dioxide at the required temperature prior to introduction to tower 6, or the tower can be maintained at the required temperature by well known cooling or heat exchange means.

The nitrobenzene recovery tower 6 is provided with several trays or stages of extraction since nitrobenzene is more soluble in oil than in carbon dioxide. The extract oil containing dissolved carbon dioxide, about 20 per cent by weight, is withdrawn from 6 through line 8 to heater 9. In the heater, carbon dioxide is expelled, leaving by line 10, and the extract oil is withdrawn through line 11.

The solution of nitrobenzene in liquid carbon dioxide is removed from tower 6 through line 12.

The raffinate phase from the original extraction is removed from tower 2 through line 13 by pump 14 to nitrobenzene recovery tower 15. The operation with the raffinate phase is then similar to that with the extract phase. Liquid carbon dioxide is charged to tower 15 through line 16; and the raffinate oil is withdrawn from 15 through line 17, heater 18 and line 19. The carbon dioxide content of the raffinate oil is removed through line 20. The mixture of carbon dioxide and nitrobenzene in tower 15 is removed through line 21 and brought together with the mixture in line 12. The combined mixture of carbon dioxide and nitrobenzene in line 21 is then introduced into heater 22. Carbon dioxide is evolved as vapor from 22 through line 23 and is combined with carbon dioxide from lines 10 and 20. Carbon dioxide vapor is led into cooler 24 wherein it is condensed to liquid, and the liquid is returned through line 7 to tower 6 and through line 16 to tower 15. Make-up or fresh liquid carbon dioxide is introduced to the system via line 25.

Nitrobenzene introduced through line 21 is removed from the bottom of heater 22 through line 3 and is recycled to extraction tower 2. Line 26 is provided for introducing make-up or fresh nitrobenzene.

It will be recognized that the foregoing illustration provided by Figure 1 is diagrammatic, and that pumps, heaters, coolers, heat exchangers, pressure vessels of various character can be employed.

As indicated above, carbon dioxide is used in liquid form, thus requiring the use of relatively low temperature and high pressures. In effect, the operating temperatures in the solvent recovery system will be not much above the critical temperature of carbon dioxide, namely, 31.1° C. While the temperature can be lowered considerably below 31.1° C. satisfactory operation has been realized with temperatures within the range of 0° C. to 35° C. Operating pressures are relatively high, generally at or about 1,000 pounds per square inch (or 70 atmospheres). Usually, pressures are of the order of 500 to 1200 pounds per square inch in the recovery system. Higher pressures make it possible to increase the solubility of various solvents in liquid carbon dioxide; however, such higher pressures also increase the solubility of oil in liquid carbon dioxide. Whether the desired selectivity of liquid carbon dioxide for solvent rather than oil, is increased or decreased by higher pressure depends upon the particular solvent.

Liquid carbon dioxide is advantageous in operation inasmuch as it is non-toxic, non-corrosive, inexpensive and is easily recovered from mixtures such as extract and raffinate phases.

The solvents selectively removed from their mixtures, when contacted with liquid carbon dioxide have greater solubility in liquid carbon dioxide than the hydrocarbons, particularly polycyclic hydrocarbons. The solvents usually have relatively high boiling points, above about 150° C., although they can have lower boiling points, as indicated above. They do not form solid compounds or complexes, such as salts, with liquid carbon dioxide at temperatures above about 20° C. Illustrative of such solvents are the following: acetic anhydride, acetonitrile, acetonyl acetone, acetophenone, benzaldehyde, benzoic anhydride, benzonitrile, butyl phthalate, Carbitol (diethylene glycol monoethyl ether), chloracetic acid, β-chloroethanol (ethylene chlorohydrin), β-chloroethyl acetate, Chlorex (β,β'-dichlorodiethyl ether), o-chlorophenol, cinnamaldehyde, cinnamyl alcohol, diacetone alcohol, dimethyl formamide, dipropylene glycol, ethyl acetoacetate, ethyl chloroacetate, ethylene diformate, ethyl lactate, ethyl maleate, ethyl oxalate, β-ethoxyethanol, ethyl succinate, ethyl sulfate, furfural, furfuryl alcohol, hydrocinnamaldehyde, β-methoxyethanol, methyl phthalate, methyl salicylate, methyl sulfate, nitrobenzene, o-nitrochlorobenzene, nitroethane, nitromethane, o-nitrophenol, 1-nitropropane, p-nitrotoluene, phenol, phenylacetonitrile, phenylethanol, phenylethanolamine, phenyl salicylate, pinacol, salicylaldehyde, tetrahydrofurfuryl alcohol, triacetin, and triethylene glycol.

Inasmuch as some of the foregoing solvents, such as Chlorex, benzonitrile, and furfural, tolerate a high concentration of carbon dioxide even when saturated with lubricating oil, it is often advantageous to remove a considerable part of the solvent from the extract phase by distilling the latter before applying liquid carbon dioxide. This preliminary distillation can be made quickly at temperatures near the boiling point of the solvent, and does not sacrifice the prime advantage of the process of this invention, which is to avoid long continued heating at temperatures considerably above the boiling point. With the raffinate phases obtained with all of the foregoing solvents, however, a preliminary distillation is unnecessary.

Although the invention has been illustrated above by the recovery of a solvent from a Pennsylvania lubricating oil stock, liquid carbon dioxide can also be used to recover solvents from numerous mixtures of varied character. The procedure described and claimed herein is also efficacious with Mid-Continent and Coastal oil fractions, gas oils, fuel oils, shale oils, coal tar fractions, animal oil fractions, vegetable oil fractions, provided they are less soluble in liquid carbon dioxide than is the solvent to be recovered. The new procedure can also be used advantageously to extract hydrocarbons, alcohols, ketones and the like, from glycols which are relatively slightly miscible with liquid carbon dioxide.

The invention is further illustrated by experimental data obtained with liquid carbon dioxide and solvents of the type described above. These experimental data are presented in the form of charts, or more particularly ternary diagrams, identified here as Figures 2 to 11. These diagrams can be used to determine: the suitability of liquid carbon dioxide for extracting a particular solvent; the selectivity of liquid carbon dioxide for a particular solvent; the range of compositions of liquid carbon dioxide, solvent and mixture associated with the solvent; the number of stages or extractions necessary to effect a separation of solvent of desired degree, etc.

Figure 2 represents the system liquid carbon dioxide Chlorex (β,β'-dichlordiethyl ether) and lubricating oil. The oil is a highly naphthenic distillate stock having the following properties:

| | |
|---|---|
| A. P. I. gravity | 23.8° |
| Density | 0.910 |
| Refractive index, $N_D^{20}$ | 1.5076 |
| Critical solution temperature (with aniline), ° C | 72 |
| Pour point, ° F | 7 |
| Flash (open cup), ° F | 395 |
| Fire, ° F | 455 |
| Viscosity, centistokes @ 100° F | 28.65 |
| Viscosity, centistokes @ 210° F | 4.51 |
| Viscosity index | 60 |
| Viscosity gravity constant | 0.871 |
| Color, Lovibond | 18 |

Figure 2 reveals that Chlorex and liquid carbon dioxide are completely miscible, and that Chlorex and the oil are incompletely miscible.

Extraction of the oil with Chlorex at room temperature and pressure provides an extract of composition $a$ and a raffinate of composition $b$. The extract is almost completely miscible with liquid carbon dioxide because of its low oil content; it is preferably distilled to recover a large part of the Chlorex. The composition of the residue will be at some point on the base line to the right of $a$, for example, $b$, $c$, or $d$, depending upon the amount of Chlorex distilled which, in turn, depends upon economic considerations. (Even if it is at $b$, the oil dissolved is not identical with the raffinate $b$. It is an extract, and merely contains the same percentage of solvent.) In any case ($b$, $c$, or $d$), and for the raffinate $b$, liquid carbon dioxide is added so that the composition varies along a dotted line toward the carbon dioxide apex until the upper binodal curve $h$—$e$—$p$—$f$—$g$ is reached, whereupon two liquid layers of compositions $e$ and $f$, for example, appear. Line $e$—$f$ is a typical tie line of the system. With further stages of extraction, as in tower 6 of Figure 1, the composition of the lower layer $f$ moves closer to the right side of zero Chlorex content, finally reaching point $g$ (this corresponds to the liquid withdrawn through line 8 and/or 17 of Figure 1). The composition of the upper layer $e$ moves closer to the left side, of zero oil content, as extraction is continued. A point $h$ of trifling oil content but substantial Chlorex content, can be selected; this corresponds to the liquid taken overhead through line 12 and/or 21 of Figure 1.

The lower binodal curve $a$—$k$—$b$ of Figure 2 has been observed but is not significant in the present process. It is a feature, however, of the process described in copending application Serial No. 160,619, filed May 8, 1950, now U. S. Patent No. 2,631,966.

Figure 3 representing the system liquid carbon dioxide-nitrobenzene-paraffinic lubricating oil stock, is similar in type to Figure 2 except that the upper curve is much deeper and closer to the left side. This feature indicates that there is no need for a preliminary distillation of solvent, nitrobenzene, from the extract layer. Yet, the position of the plait point, far to the left, indicates that the tie lines are oriented as shown so that nitrobenzene dissolves in the oil layer in preference to the liquid carbon dioxide layer. In order to extract the nitrobenzene completely from the oil with liquid carbon dioxide, several stages of extraction are required. In connection with using nitrobenzene, it should be noted that nitrobenzene is suitable for extracting a naphthenic oil of the type used in the system in Figure 2, only at very low temperatures. Thus, the lower binodal curve is missing for nitrobenzene with a naphthenic oil at conventional extraction temperatures. That is, nitrobenzene mixes with naphthenic oils and the original extraction is inoperative at room temperature.

Benzaldehyde (Figure 4) is similar to nitrobenzene in behavior, and requires a low temperature for the original extraction. A preliminary distillation of part of the solvent from the extract phase is often helpful, but not required.

Additional illustrations include the following:

Figure 5: liquid carbon dioxide-benzonitrile-paraffinic lubricating oil.

Figure 6: liquid carbon dioxide-furfural-lubricating oil.

Figure 7: liquid carbon dioxide-β-chloroethanol-lubricating oil.

Figure 8: liquid carbon dioxide-benzal acetone-lubricating oil.

Figure 9: liquid carbon dioxide-ethylene diformate-lubricating oil.

Figure 10: liquid carbon dioxide-hydrocinnamaldehyde-lubricating oil.

Figure 11: liquid carbon dioxide-phenylacetonitrile-lubricating oil.

Figure 12: liquid carbon dioxide-ethylene glycol-Carbitol (diethylene glycol monoethyl ether).

Benzonitrile, illustrated in Figure 5, is still more miscible with lubricating oil than is nitrobenzene, and cannot be used for extraction much above 0° C. It is also characterized by a very shallow curve with liquid carbon dioxide and lubricating oil. Therefore, although recovery of benzonitrile from the raffinate phase is accomplished readily by using liquid carbon dioxide; with the extract phase, it is recommended that the bulk of the benzonitrile be removed in a preliminary distillation.

Figure 6 reveals that furfural is quite different with liquid carbon dioxide, inasmuch as the two binodal curves merge. The extract layer $f$ contains so little oil that it is miscible with liquid carbon dioxide. Therefore, it is advantageous to distill most of the furfural from the extract phase before contacting it with liquid carbon dioxide. The raffinate layer, R, however, is favorable for extraction since furfural dissolves in liquid carbon dioxide in preference to the oil ($e$ as compared with $r$) so that a few stages of extraction are sufficient to recover substantially all of the furfural.

Still another type of diagram is shown in Figure 7. This illustrates the system: liquid carbon dioxide-$\beta$-chloroethanol-lubricating oil, wherein $\beta$-chloroethanol is incompletely miscible with liquid carbon dioxide and wherein three liquid layers are formed. $\beta$-Chloroethanol is readily recovered from the raffinate layer when liquid carbon dioxide is used; and, since $\beta$-chloroethanol is much more soluble in liquid carbon dioxide than is the lubricating oil, liquid carbon dioxide is also satisfactory for recovering the solvent from the extract phase.

Figure 8:
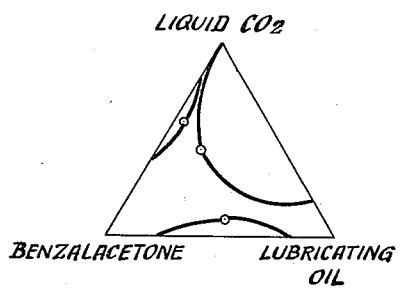
Figure 8 illustrates the system, liquid carbon dioxide-benzalacetone-lubricating oil, characterized by three separate binodal curves.
Figure 9:
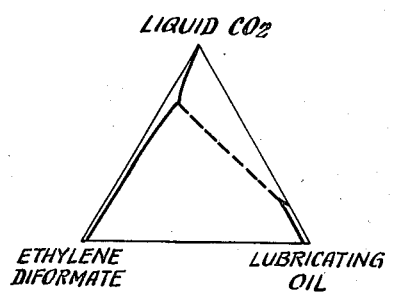
Figure 9 shows the system: liquid carbon dioxide-ethylene diformate-lubricating oil.
Figure 10:
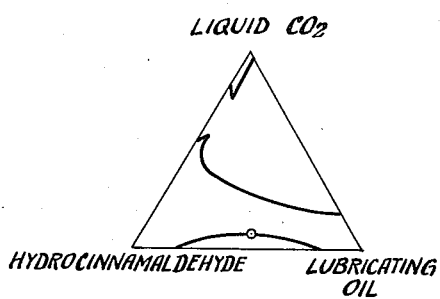
Figures 10 and 11 show similar systems with the solvents hydrocinnamaldehyde and phenylacetonitrile, respectively. In these systems, two of the three binodal curves are merged.
Figure 11:
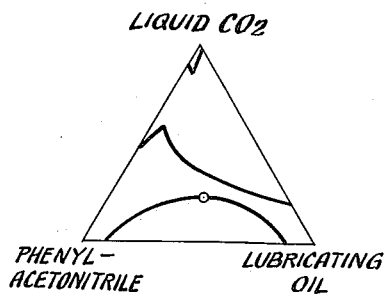
Figure 12:
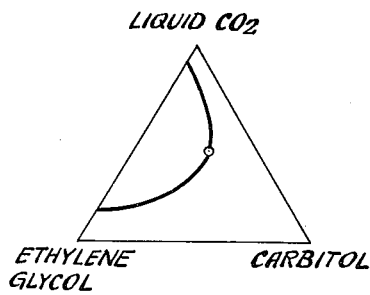

Figure 12 illustrates the system: liquid carbon dioxide-ethylene glycol-Carbitol (diethylene glycol monoethyl ether). Thus, no hydrocarbon is present. Liquid carbon dioxide is useful, therefore, for separating Carbitol from the glycol, which is a common impurity in commercial Carbitol. It is difficult to separate Carbitol and the glycol by distillation because they boil at nearly the same temperature, 198.1° C. and 201.8° C., respectively.

Additional solvents studied and contemplated herein are characterized by ternary diagrams similar to those illustrated by Figures 2–12. In all cases, a lubricating oil and liquid carbon dioxide are involved.

Figure 2

| | |
|---|---|
| Carbitol | Ethyl lactate |
| Chlorex | Ethyl oxalate |
| Diacetone alcohol | $\beta$-Ethoxyethanol |
| Ethyl acetoacetate | Ethyl succinate |

Figure 3

| | |
|---|---|
| Ethylchloroacetate | Isopropyl alcohol |
| Nitrobenzene | 1-nitropropane |
| o-Nitrophenol | |

Figure 4

| | |
|---|---|
| Acetophenone | Methyl salicylate |
| Benzaldehyde | o-Nitrotoluene |
| o-Chlorophenol | Salicylaldehyde |

Figure 5

Benzonitrile

Figure 6

| | |
|---|---|
| Acetic anhydride | Ethyl sulfate |
| Acetonitrile | Furfural |
| Acetonyl acetone | $\beta$-Methoxyethanol |
| $\beta$-Chloroethyl acetate | Methyl sulfate |
| Dimethylformamide | Nitroethane |
| Ethylene diformate | Nitromethane |
| Ethyl maleate | Triacetin |

Figure 7

| | |
|---|---|
| Aniline (with paraffinic oil) | Dipropylene glycol |
| | Furfuryl alcohol |
| $\beta$-Chloroethanol | Phenyl ethanolamine |
| Cinnamyl alcohol | Triethylene glycol |

Figure 10

| | |
|---|---|
| Cinnamaldehyde | Phenylethanol |
| Hydrocinnamaldehyde | Pinacol |
| o-Nitrochlorobenzene | o-Toluidine |

Figure 11

| | |
|---|---|
| Aniline (with naphthenic oil) | Methyl phthalate |
| | Phenol |
| o-Anisidine | Phenylacetonitrile |
| Benzoic anhydride | Tetrahydrofurfuryl alcohol |
| o-Nitrobiphenyl | |

More than sixty additional solvents have been studied with lubricating oils and liquid carbon dioxide. Such solvents include pyridine, butyl phthalate, thiophene, thioxane, all of which have ternary diagrams similar to Figures 4 or 5 above. These solvents could be separated from oil by extraction with liquid carbon dioxide; however, they are completely miscible with oils and, therefore, are not suitable for extraction of oils.

In all cases with unmerged binodal curves a small circle is shown. This is the plait point or critical solution point, that is, the point at which the compositions of two liquid phases approach each other so that the interface fades out as a critical point. The position of the plait point can be of considerable importance. For example, in Figure 2 the upper plait point is in the middle of the curve so that the tie lines are nearly parallel with the right side of the triangle. This indicates that Chlorex is distributed evenly between oil and liquid carbon dioxide, and can be extracted from the oil in a moderate number of extraction states. In Figure 3, the plait point is far to the left side so that the tie lines are steep with respect to the right side of the triangle, indicating that nitrobenzene dissolves by preference in the oil and a substantial number of extraction stages are required.

The data from which Figures 2–12 were prepared, were obtained with a visual autoclave, operating at room temperature, about 25° C. The autoclave is a Jerguson gauge of 116 parts by volume capacity, with thick narrow Pyrex glass windows front and back. Incandescent lamps are mounted behind the vertical position of the autoclave. Agitation of the materials is obtained by rotation, end-over-end, within a heat-insulated case. The latter is provided with strip heaters which permit heating by radiation, and with means for cooling to low temperature. The autoclave was charged with the liquid reagents, liquid carbon dioxide being introduced from a cylinder. Solubility of carbon dioxide in another liquid was estimated by charging a definite volume of that liquid and then adding carbon dioxide until after agitation a new liquid phase appeared (at the top). Then additional increments of liquid carbon dioxide were added. By extrapolation, the drop in equilibrium position of the interface could be used to estimate approximately the solubility of the other liquid in liquid carbon dioxide. If there was no separation of two liquid phases, this miscibility was considered to be complete only after about three volumes of carbon dioxide were added for one of the other liquids.

I claim:

1. In a solvent recovery following a solvent extraction treatment of a mixture selected from the group consisting of hydrocarbon mixtures ranging from gas oils to lubricating oil stocks, with a solvent identified hereinbelow, and in which solvent extraction treatment a phase comprising raffinate comprising solvent and a phase comprising solvent containing extract are formed, said solvent extraction treatment being conducted in the absence of liquid carbon dioxide, the improvement which comprises: extracting a solvent-extraction phase with liquid carbon dioxide under pressure sufficient to maintain a carbon dioxide-rich phase in the liquid state, whereupon a solvent-liquid carbon dioxide phase and a hydrocarbon phase are formed; separating said solvent-liquid carbon dioxide phase and said hydrocarbon phase; and removing carbon dioxide from said solvent-liquid carbon dioxide phase, whereby said solvent is recovered substantially free from components of said mixture; the solvent being selected from the group consisting of: acetic anhydride, acetonitrile, acetonyl acetone, acetophenone, benzaldehyde, benzoic anhydride, benzonitrile, butyl phthalate, Carbitol (diethylene glycol monoethyl ether), chloracetic acid, β-chloroethanol (ethylene chlorohydrin), β-chloroethyl acetate, Chlorex (β,β'-dichlorodiethyl ether), o-chlorophenol, cinnamaldehyde, cinnamyl alcohol, diacetone alcohol, dimethyl formamide, dipropylene glycol, ethyl acetoacetate, ethylchloroacetate, ethylene diformate, ethyl lactate, ethyl maleate, ethyl oxalate, β-ethoxyethanol, ethyl succinate, ethyl sulfate, furfural, furfuryl alcohol, hydrocinnamaldehyde, β-methoxyethanol, methyl phthalate, methyl salicylate, methyl sulfate, nitrobenzene, o-nitrochlorobenzene, nitroethane, nitromethane, o-nitrophenol, 1-nitropropane, p-nitrotoluene, phenol, phenylacetonitrile, phenylethanol, phenylethanolamine, phenyl salicylate, pinacol, salicylaldehyde, tetrahydrofurfuryl alcohol, triacetin, and triethylene glycol.

2. In a solvent extraction and recovery system wherein a hydrocarbon mixture selected from the group consisting of hydrocarbon mixtures ranging from gas oils to lubricating oil stocks, is subjected to an extraction by contact with a solvent liquid identified hereinbelow, and wherein a phase comprising raffinate containing solvent and a phase comprising solvent containing extract are formed, said solvent extraction treatment being conducted in the absence of liquid carbon dioxide, the improvement which comprises: extracting a solvent-extraction phase with liquid carbon dioxide under pressure sufficient to maintain a carbon dioxide-rich phase in the liquid state, whereupon a solvent-liquid carbon dioxide phase and a hydrocarbon phase are formed; separating said solvent-liquid carbon dioxide phase and said hydrocarbon phase; and removing carbon dioxide from said solvent-liquid carbon dioxide phase, whereby said solvent is recovered substantially free from components of said hydrocarbon mixture; said solvent being selected from the group consisting of: acetic anhydride, acetonitrile, acetonyl acetone, acetophenone, benzaldehyde, benzoic anhydride, benzonitrile, butyl phthalate, Carbitol (diethylene glycol monoethyl ether), chloracetic acid, β-chloroethanol (ethylene chlorohydrin), β-chloroethyl acetate, Chlorex (β,β'-dichlorodiethyl ether), o-chlorophenol, cinnamaldehyde, cinnamyl alcohol, diacetone alcohol, dimethyl formamide, dipropylene glycol, ethyl acetoacetate, ethylchloroacetate, ethylene diformate, ethyl lactate, ethyl maleate, ethyl oxalate, β-ethoxyethanol, ethyl succinate, ethyl sulfate, furfural, furfuryl alcohol, hydrocinnamaldehyde, β-methoxyethanol, methyl phthalate, methyl salicylate, methyl sulfate, nitrobenzene, o-nitrochlorobenzene, nitroethane, nitromethane, o-nitrophenol, 1-nitropropane, p-nitrotoluene, phenol, phenylacetonitrile, phenylethanol, phenylethanolamine, phenyl salicylate, pinacol, salicylaldehyde, tetrahydrofurfuryl alcohol, triacetin, and triethylene glycol.

3. The method of recovering a solvent from a mixture containing the same and a hydrocarbon fraction selected from the group consisting of hydrocarbon fractions ranging from gas oils to lubricating oil stocks, said solvent being identified hereinbelow, which comprises: extracting said mixture with liquid carbon dioxide under pressure sufficient to maintain a carbon dioxide phase in the liquid state, whereupon a solvent-liquid carbon dioxide phase and a hydrocarbon phase are formed; separating said solvent-liquid carbon dioxide phase and said hydrocarbon phase; and removing carbon dioxide from said solvent-liquid carbon dioxide phase, whereby said solvent is recovered substantially free from components of said hydrocarbon fraction; said solvent being selected from the group consisting of: acetic anhydride, acetonitrile, acetonyl acetone, acetophenone, benzaldehyde, benzoic anhydride, benzonitrile, butyl phthalate, Carbitol (diethylene glycol monoethyl ether), chloracetic acid, β-chloroethanol (ethylene chlorohydrin), β-chloroethyl acetate, Chlorex (β,β'-dichlorodiethyl ether), o-chlorophenol, cinnamaldehyde, cinnamyl alcohol, diacetone alcohol, dimethyl formamide, dipropylene glycol, ethyl acetoacetate, ethylchloroacetate, ethylene diformate, ethyl lactate, ethyl maleate, ethyl oxalate, β-ethoxyethanol, ethyl succinate, ethyl sulfate, furfural, furfuryl alcohol, hydrocinnamaldehyde, β-methoxyethanol, methyl phthalate, methyl salicylate, methyl sulfate, nitrobenzene, o-nitrochlorobenzene, nitroethane, nitromethane, o-nitrophenol, 1-nitropropane, p-nitrotoluene, phenol, phenylacetonitrile, phenylethanol, phenylethanolamine, phenyl salicylate, pinacol, salicylaldehyde, tetrahydrofurfuryl alcohol, triacetin, and triethylene glycol.

4. The method of recovering a solvent from a mixture containing the same and a lubricating oil fraction, which comprises: extracting said mixture with liquid carbon dioxide under pressure sufficient to maintain a carbon dioxide-rich phase in the liquid state, whereupon a solvent-liquid carbon dioxide phase and lubricating oil fraction phase are formed; separating said phases one from the other; and removing carbon dioxide from said solvent-liquid carbon dioxide phase, whereby said solvent is recovered substantially free from components of said lubricating oil stock; said solvent being selected from the group consisting of: acetic anhydride, acetonitrile, acetonyl acetone, acetophenone, benzaldehyde, benzoic anhydride, benzonitrile, butyl phthalate, Carbitol (diethylene glycol monoethyl ether), chloracetic acid, β-chloroethanol (ethylene chlorohydrin), β-chloroethyl acetate, Chlorex (β,β'-dichlorodiethyl ether), o-chlorophenol, cinnamaldehyde, cinnamyl alcohol, diacetone alcohol, dimethyl formamide, dipropylene glycol, ethyl acetoacetate, ethylchloroacetate, ethylene diformate, ethyl lactate, ethyl maleate, ethyl oxalate, β-ethoxyethanol, ethyl succinate, ethyl sulfate, furfural, furfuryl alcohol, hydrocinnamaldehyde, β-methoxyethanol, methyl phthalate, methyl salicylate, methyl sulfate, nitrobenzene, o-nitrochlorobenzene, nitroethane, nitromethane, o-nitrophenol, 1-nitropropane, p-nitrotoluene, phenol, phenylacetonitrile, phenylethanol, phenylethanolamine, phenyl salicylate, pinacol, salicylaldehyde, tetrahydrofurfuryl alcohol, triacetin, and triethylene glycol.

5. The method as defined by claim 4 wherein the solvent is benzonitrile.

6. The method as defined by claim 4 wherein the solvent is β,β'-dichlorodiethyl ether.

7. The method as defined by claim 4 wherein the solvent is furfural.

8. The method as defined by claim 4 wherein the solvent is nitrobenzene.

9. The method of recovering diethylene glycol monoethyl ether from a mixture containing the same and ethylene glycol, which comprises: extracting said mixture with liquid carbon dioxide under pressure sufficient to maintain a carbon dioxide-rich phase in the liquid state, whereupon a diethylene glycol monoethyl ether-liquid carbon dioxide phase is formed; separating said phase from the remainder of the mixture; and removing carbon dioxide from said ether-liquid carbon dioxide phase.

10. In a solvent extraction process wherein a lubricating oil stock is contacted with a solvent identified hereinbelow, whereby a raffinate containing solvent phase and a solvent containing extract phase are formed, wherein said phases are separated one from the other, and wherein solvent is recovered from each of said phases, all of said operations being conducted in the absence of carbon dioxide, the improvement in solvent recovery which comprises: extracting each of the separated solvent-containing phases separately with liquid carbon dioxide under pressure sufficient to maintain in each case a carbon dioxide-rich phase in the liquid state, to form in one case a two-phase system one phase of which comprises solvent and carbon dioxide and the other phase of which comprises hydrocarbon raffinate, and in the other case a two-phase system one phase of which comprises solvent and carbon dioxide and the other phase of which comprises hydrocarbon extract; separately removing the hydrocarbon raffinate and the hydrocarbon extract from the system; combining the solvent-carbon dioxide phases; removing carbon dioxide from the resulting combined solvent-carbon dioxide phase, whereby said solvent is recovered susbtantially free from components of said lubricating oil stock, and returning to the initial oil stock contacting operation solvent substantially free of carbon dioxide; said solvent being selected from the group consisting of: acetic anhydride, acetonitrile, acetonyl acetone, acetophenone, benzaldehyde, benzoic anhydride, benzonitrile, butyl phthalate, Carbitol (diethylene glycol monoethyl ether), chloracetic acid, β-chloroethanol (ethylene chlorohydrin), β-chloroethyl acetate, Chlorex (β,β' - dichlorodiethyl ether), o-chlorophenol, cinnamaldehyde, cinnamyl alcohol, diacetone alcohol, dimethyl formamide, dipropylene glycol, ethyl acetoacetate, ethylchloroacetate, ethylene diformate, ethyl lacate, ethyl maleate, ethyl oxalate, β-ethoxyethanol, ethyl succinate, ethyl sulfate, furfural, furfuryl alcohol, hydrocinnamaldehyde, β-methoxyethanol methyl phthalate, methyl salicylate, methyl sulfate, nitrobenzene, o-nitrochlorobenzene, nitroethane, nitromethane, o-nitrophenol, 1-nitropropane, p-nitrotoluene, phenol, phenylacetonitrile, phenylethanol, phenylethanolamine, phenyl salicylate, pinacol, salicylaldehyde, tetrahydrofurfuryl alcohol, triacetin, and triethylene glycol.

ALFRED W. FRANCIS.

References Cited in the file of this patent

UNITED STATES PATENTS

| Number | Name | Date |
|---|---|---|
| 1,805,751 | Auerbach | May 19, 1931 |
| 2,130,147 | Milmore | Sept. 13, 1938 |
| 2,188,051 | Lantz | Jan. 23, 1940 |
| 2,265,757 | Greensfelder | Dec. 9, 1941 |